Dec. 22, 1970   J. R. BEATTY ET AL   3,548,652
TACK TESTER
Filed March 11, 1968
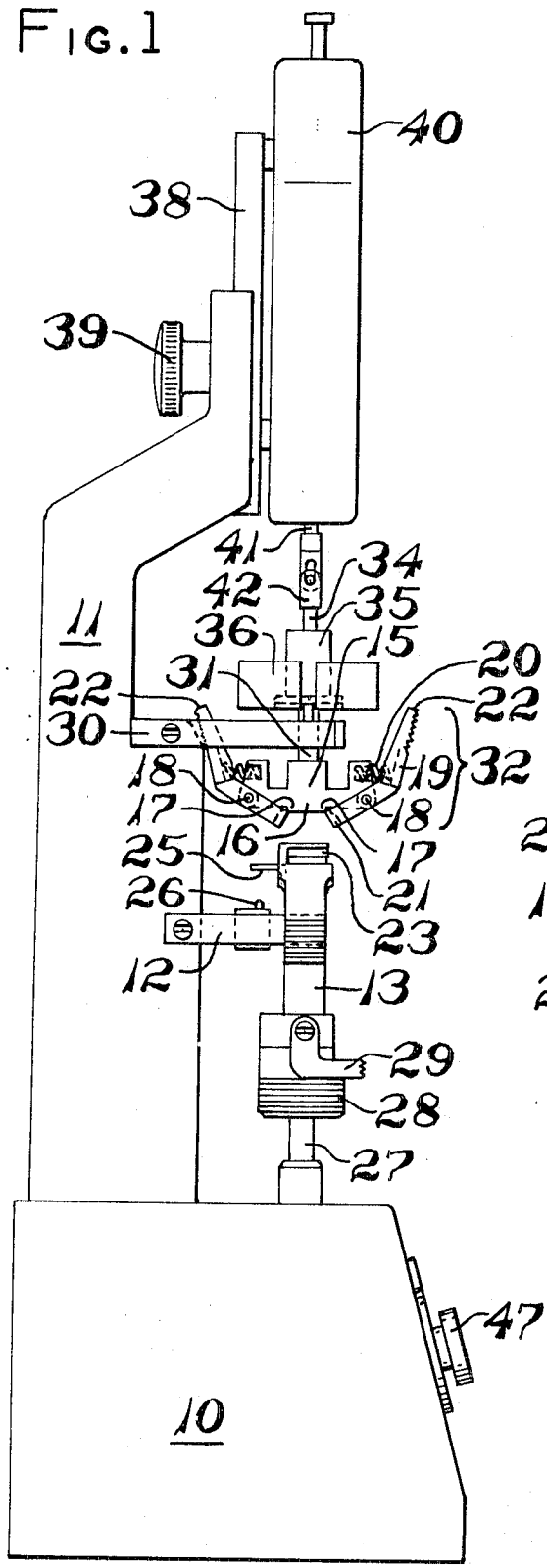
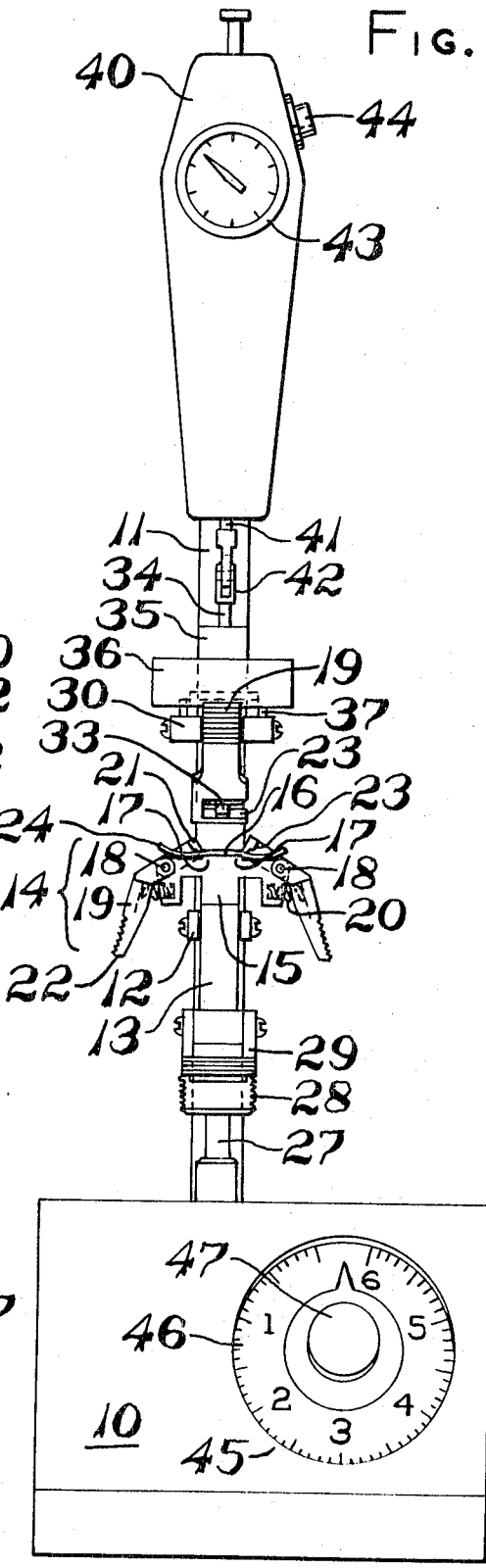

United States Patent Office 3,548,652
Patented Dec. 22, 1970

1

3,548,652
TACK TESTER
James R. Beatty and Krishna C. Baranwal, Akron, Ohio, assignors to The B. F. Goodrich Company, New York, N.Y., a corporation of New York
Filed Mar. 11, 1968, Ser. No. 712,272
Int. Cl. G01n 19/04
U.S. Cl. 73—150                                        3 Claims

ABSTRACT OF THE DISCLOSURE

An instrument for measuring tack has upper and lower clamps for holding specimen strips at right angles. Manual lifting of the lower clamps against the upper clamps causes a determined weight to press the specimen surfaces together and starts a timer. The timer starts a motor for separating the clamps, and the separating force is indicated by a spring balance.

BACKGROUND

Measurement of adhesion or tack has been sometimes by determination of the pull required for separation in a direction perpendicular to the surfaces, but more often by peeling a strip parallel to the adhered surfaces with the result expressed as force per unit width of the strip. While such measurements of resistance to peeling of a strip, per unit of width, are useful in comparing strengths of final adhesive bonds, they have not been found to be helpful in studying the self-adhesion or true tack of elastomers.

The few instruments arranged for measuring perpendicular forces have found little use, as they have generally been arranged for contact of a standard surface with an adhesive, and have not been adaptable for accurate measurement of the adhesion or tack of both similar and different materials.

SUMMARY OF THE INVENTION

We have devised an instrument for the precise and reproducible measurement of eitther tack or adhesion, by apposition of exactly known areas of the materials to be measured, under a determined load for a determined time, followed by automatic separation at a constant rate and indication of the maximum force required for separation. The result is expressed in terms of force per unit area.

The areas to be placed in contact are determined in a particularly simple and convenient fashion by preparing the specimens as narrow strips of identical width, mounting them with their ends held in clamps disposed with their axes at right angles, and moving the clamps toward one another to bring the surfaces in contact. The width of the specimens is easily maintained at a desired value by cutting them from sheet material a cutting die having parallel edges the proper distance apart. The area of contact is then the square of the distance between the cut edges of the specimen strips.

This instrument has a weight for holding the tacky surfaces in contact before the measurement, a timer for removing the weight load and for commencing application of the separating force to one of the sets of clamps after the desired interval of contact, and a spring balance for indicating the separating force on the other set of clamps. In addition, starting and stopping switches connect the mechanisms so that the different steps of the measurement follow one another automatically once the procedure is started.

2

THE DRAWINGS

In the accompanying drawings, FIG. 1 is a side view of the tack tester and FIG. 2 is the front view.

DESCRIPTION OF THE PREFERRED EMBODIMENT

The tack tester is mounted on a box-like base 10 on the back of which is a post 11 supporting the vertically superimposed functional parts of the instrument.

Near the bottom of the post 11 is a bracket 12 functioning as a guide for a vertically movable bar 13 surmounted by the lower set of clamps 14. The clamps comprise a transverse head 15 having a smooth flat upper surface 16 bounded by shoulders 17. Beyond the shoulders are pivots 18 on which are hinged clamping levers 19 with springs 20 urging the inner ends 21 firmly against the shoulders 17. The outer ends 22 of the clamping levers 19 are bent downwardly so that when they are pressed together the inner ends 21 are lifted off the shoulders 17. The inner ends 21 contain deep notches 23 extending from the front edge, so that a specimen strip 24 (shown in FIG. 2 only) can be slipped easily into the notches from the front while the clamping levers are temporarily lifted from the shoulders 17, and the specimen will then be accurately located and firmly held in place when the clamping levers are released.

Attached to the back of the clamp head 15 is a tang 25 directly above a switch 26 mounted on the bracket 12, for a purpose which will be explained later.

The bar 13 supporting the lower clamps 14 is arranged for steady downward motion during operation of the instrument. This is accomplished by provision of a motor-driven vertical supporting shaft 27 projecting from the base 10. The speed of rotation of the shaft 27 may be varied. The motor and reduction gear for this shaft 27 are housed within the base 10. The bar 13 terminates at its bottom end in a coupling 28 snugly engaging the cylindrical part of the shaft 27. A handle 29 on the coupling 28 can be swung forward to disengage an internal half nut from the threaded upper end of the vertical shaft 27, so that the bar and its set of clamps 14 can be moved vertically and re-engaged with the shaft 27 in a different vertical position.

Higher up on the post 11 is another bracket 30 functioning as a guide for a vertically movable bar 31 at the lower end of which is the upper set of clamps 32, identical in every respect with the lower clamps 14 except that they face down instead of up, and have their axis at a right angle to the clamps 14. The upper clamps 32 consequently have a head 15 with a flat surface 16 bounded by shoulders 17, and also have pivots 18 on which are hinged clamping levers 19 with springs 20 to hold the inner ends 21 against the shoulders 17 except when the outer ends 22 are pressed together. Notches 23 are provided to receive the ends of the second specimen 33, (shown in FIG. 2 only) which extends from front to rear, at right angles to the lower specimen 24 because of the right angle relation of the upper clamps 32 to the lower clamps 14.

The bar 31 is reduced in diameter at its upper end 34, so that a shoulder supports a flanged sleeve 35 on which slotted interchangeable weights 36 can be placed. Recessed in bracket 30 is a switch 37 engaged by weight 36 when it rests on the bracket 30.

At the top of post 11 is a rack and pinion slide 38, operated by a knob 39, supporting spring balance 40 having a vertical stem 41 projecting from the bottom of its case. The upper end 34 of bar 31 is connected to stem 41 of the spring balance by a slotted lost-motion connection 42, permitting the upper jaws 32 and weights 36 to be lifted to open the switch 37 without affecting the spring balance 40. The spring balance 40 has a rotatable dial 43 for setting the instrument to a zero reading before commencement of a test, and a latch 44 for holding the needle at its maximum reading.

A timer 45, which may be mounted on the base 10, has a dial 46 marked in minutes, and a rotatable knob and pointer 47. It is wired up so that opening of the switch 37 by picking up of the weights 36 from the bracket 30 supporting the upper clamps 32 will start the timer, and so that return of the timer to zero on expiration of the set time will start the motor which turns shaft 27, thereby lowering the lower clamps 14, while completion of downward motion of the lower clamps 14 will cause tang 25 to depress switch 26 and stop all action of the instrument.

In operation of the instrument it is convenient to use specimens ¼ inch wide, as the result of which the crossed lower specimen 24 and upper specimen 33 will make contact over an area of exactly ⅟₁₆ square inch. This means that the force indicated on the dial 43 will need be multiplied by 16 to give the force per square inch. Consequently, since there are 16 ounces in a pound, when ¼ inch wide specimens are used, and the dial 43 is calibrated in ounces, the numerical reading will correspond to pounds per square inch.

To carry out a test, the proper size weight 36 is selected to give the desired load pressing the faces of the specimens together, such as a weight which when added to the weight of the upper clamps and their support will equal 1 pound, corresponding to 16 pounds per square inch load on the area of contact of cross ¼ inch wide specimens. Other values of pressure may be obtained by use of other size weights. The rack and pinion slide 38 is adjusted by knob 39 so that the weight 36 and sleeve 35 rest firmly on the bracket 30 with the switch 37 depressed, and so that the bar 31 (with the upper clamps 32) is just disengaged from the weight 36 and is suspended from the spring balance stem 41.

The specimens of the desired materials, and of the chosen width such as ¼ inch, are then mounted in the lower jaws 14 and upper jaws 32. The latch 44 is opened to release the needle of the spring balance, the dial 43 is turned to bring the zero mark opposite the needle, and the latch 44 is closed to cause the needle later to remain at its highest reading. The timer knob 47 is turned to the desired number of minutes contact time.

The actual test is started by raising the handle 29, lifting the coupling 28 along with the bar 13 and lower clamps 14 so that the specimen 24 engages and lifts the specimen 33 along with the upper clamps 32, bar 31, sleeve 35 and weight 36 by a sufficient distance to lift the weight clear of the switch 37 to start the timer, and the coupling 28 is then held in its elevated position by lowering the handle 29 to cause the half nut to engage the threaded upper end of shaft 27 in an elevated position.

The opening of the switch 37 causes the test to be completed automatically, as this starts the timer, the timer determines the proper interval and starts the motor which drives shaft 27 and steadily lowers the lower clamps 14, and finally at the extreme bottom position the switch 26 stops the instrument. The first part of the downward motion causes the weight 36 and sleeve 35 to be deposited on the bracket 30 and to be disengaged from the downwardly moving bar 31. The next part of the motion causes the lost motion to be taken up in the connection 42 so that tension begins to be exerted against the spring of the spring balance 40.

The maximum tension, which is the pull required to separate the faces of the two specimens 24 and 33, is automatically indicated by the needle which remains at its position so that it can be read at the convenience of the operator at any time before the next test.

The machine is immediately ready for another test, requiring only removal of the specimens and replacement by new specimens, momentary release of the needle latch 44 to restore the needle to its zero position, and resetting of the dial 43 to zero if the new specimens are of a different weight, and resetting of the timer knob 47.

This instrument is especially useful in measuring the true tack or self-adhesion of elastomers. For that purpose the natural rubber or synthetic rubber, if not already on a fabric of some kind so that it need only be cut into strips, is preferably pressed in a thin layer on a fabric which will withstand the tension of the measuring operation. A non-adhesive film such as cellophane or polyester film is preferably pressed against the free surface to assure smoothness and to protect the surface against contamination until just before the test, when the film is removed.

This instrument is ideally adapted for studying the difference between true tack or self-adhesiveness (characteristic of natural rubber) and of mere stickiness (characteristic of most synthetic elastomers). This is done by comparing the results of adhesion of identical specimens of the rubber or synthetic elastomer to one another on one hand, with adhesion of such a specimen to a standard stainless steel surface on the other hand. The standard surface of metal or other rigid material is prepared in advance, as a strip of the desired width, and is received and held by the clamping levers 19 in the same manner as strips of flexible materials.

Extensive tests with many materials over a wide range of conditions have shown the instrument to give consistently reproducible results. Individual measurements under identical conditions vary by only small amounts, so that averaging of three measurements gives figures varying only slightly from the true mean.

As would be expected, the measurements are dependent on the load and contact time, which are the conditions which the operator can vary. Nevertheless, for common elastomers, loads above a certain critical low load have a rather small effect, so that it is usually most convenient to carry out all measurements at a single load, such as 1 pound (corresponding to 16 pounds per square inch when ¼ inch strips are used). Time of contact is somewhat more critical, in that adhesion values increase rapidly with time up to about 30 seconds, but increase only slowly with further increase in time of contact. Consequently, one minute of contact has been found to be a convenient interval for many purposes.

Although measurements at room temperature and in air are most convenient, higher or lower temperatures and different atmospheres are easily employed by simply enclosing the instrument, along with the specimens to be tested, in a temperature-controlled or gas-tight cabinet.

We claim:

1. An instrument for measuring tack, comprising a pair of specimen holders having parallel opposed flat horizontal specimen-receiving surfaces in vertical alignment mounted for vertical rectilinear motion toward and away from each other, each specimen holder having clamps to grip the ends of specimens in narrow strip form and hold the specimens against the opposed surfaces of the holders, the specimen holders being crossed at right angles to permit opposition of the specimen strips across each other, means for applying a gravity load for pressing the specimen strips together, a settable timer having an actuator connected to start the timer on application of the gravity load to the specimen srips, means for separating the specimen holders, means providing a releasable connection of the lower specimen holder to the means for separating the specimen holders such that the lower specimen holder is manually movable upward to engage and lift the upper specimen holder and thereby press the specimen strips together under the gravity load associated with the upper specimen holder, means connecting the timer with the separating means to activate the separating means on elapse of the set time, and means for measuring the separating force.

2. An instrument for measuring tack, comprising a pair of specimen holders having parallel opposed flat specimen-receiving surfaces movable vertically toward and away from each other and clamps for releasably retaining on the said surfaces a pair of specimen strips of the material to be tested, a force measuring means attached to one holder, means connected to the other holder for moving it away from the one holder, a settable timer connected to the means for moving the other holder to initiate its motion after elapse of the set time, and a timer actuator located for operation by juxtaposition of the holders in specimen engaging relationship.

3. An instrument as defined in claim 2 further including means for pressing the specimen strips together under a pre-determined gravity load, said means comprising the weight of one of said specimen holders and means on said one specimen holder for the reception of removable weights to thereby adjust the said gravity load.

References Cited

UNITED STATES PATENTS

| | | | |
|---|---|---|---|
| 3,246,513 | 4/1966 | Morris | 73—150 |
| 3,253,461 | 5/1966 | Blanchard et al. | 73—150 |
| 3,269,176 | 8/1966 | Egitto et al. | 73—150 |
| 3,368,398 | 2/1968 | Skewis | 73—150 |
| 3,394,588 | 7/1968 | Mohle et al. | 73—150 |

LOUIS R. PRINCE, Primary Examiner

W. A. HENRY II, Assistant Examiner